(12) United States Patent
Schmidt

(10) Patent No.: US 8,457,884 B2
(45) Date of Patent: *Jun. 4, 2013

(54) METHOD FOR THE OPERATION OF A NAVIGATION SYSTEM

(75) Inventor: Thorsten W. Schmidt, Kitzingen (DE)

(73) Assignee: Garmin Würzburg GmbH (DE)

( * ) Notice: Subject to any disclaimer, the term of this patent is extended or adjusted under 35 U.S.C. 154(b) by 384 days.

This patent is subject to a terminal disclaimer.

(21) Appl. No.: 12/741,326

(22) PCT Filed: Oct. 9, 2008

(86) PCT No.: PCT/DE2008/001626
§ 371 (c)(1),
(2), (4) Date: Aug. 10, 2010

(87) PCT Pub. No.: WO2009/059575
PCT Pub. Date: May 14, 2009

(65) Prior Publication Data
US 2011/0015855 A1      Jan. 20, 2011

(30) Foreign Application Priority Data
Nov. 6, 2007  (DE) .......................... 10 2007 053 213

(51) Int. Cl.
*G01C 21/00* (2006.01)
(52) U.S. Cl.
USPC ............................ 701/430; 701/420; 701/450
(58) Field of Classification Search
USPC ......................................... 701/420, 430, 450
See application file for complete search history.

(56) References Cited

U.S. PATENT DOCUMENTS

| 5,177,685 | A | 1/1993 | Davis et al. | |
| 6,199,013 | B1 * | 3/2001 | O'Shea | 701/431 |
| 6,385,542 | B1 | 5/2002 | Millington | |
| 8,180,568 | B2 * | 5/2012 | Schmidt | 701/437 |

FOREIGN PATENT DOCUMENTS

| DE | 699 33 422 | 5/2007 |
| EP | 0 892 248 | 1/1999 |
| EP | 0 893 308 | 1/1999 |
| EP | 1 003 016 | 5/2000 |
| EP | 1 460 537 | 9/2004 |

OTHER PUBLICATIONS

International Search Report as mailed on Apr. 6, 2009 for International Application No. PCT/DE2008/001626.
International Search Report and Written Opinion as mailed on Apr. 6, 2009 for International Application No. PCT/DE2008/001626 (translated into English).

* cited by examiner

*Primary Examiner* — Mary Cheung
*Assistant Examiner* — Yuen Wong
(74) *Attorney, Agent, or Firm* — Samuel M. Korte; Mohammad M. Ali

(57) ABSTRACT

The present invention relates to a method for operating a navigation system comprising the following method steps: a) calculating a route from a point of departure to a destination, said route being composed of a succession of route segments and junctions between the route segments and being selected by means of a route calculation process from a database in which a geographical region is described by route segments and junctions; b) calculating at least one maneuvering instruction which contains instructions for the user to follow the route starting from the current position; c) optically and/or acoustically outputting the maneuvering instruction in an output device, wherein prior to and/or during the calculation and/or prior to and/or during the output of the maneuvering instruction, a configuration file is read and interpreted by an interpretation module, and wherein configuring preset data for calculating and/or outputting the maneuvering instruction are stored in the configuration file.

16 Claims, 4 Drawing Sheets

| coarse classification | very remote | remote | proximate | very proximate |
|---|---|---|---|---|
| leave freeway | 10000 | 3000 | 1000 | 300 |
| priority road maneuver | - | 700 | 250 | 50 |

Fig. 4

METHOD FOR THE OPERATION OF A NAVIGATION SYSTEM

CROSS-REFERENCE TO RELATED APPLICATIONS

The present application claims the benefit of German Patent Application No. 10 2007 053 213.1 filed Nov. 6, 2007, and the benefit of PCT International Application No. PCT/DE2008/001626 filed Oct. 9, 2008, both of which are incorporated herein by reference for all purposes.

The present invention relates to a method for operating a navigation system according to the preamble of claim 1.

Known navigation systems, which are for instance used as mobile navigation devices for motor vehicles, basically serve the purpose of calculating travel routes from a point of departure to a destination. Starting from the calculated route, the known navigation systems correspondingly contain a route guidance component in which maneuvering instructions for the user are calculated. In this context, the maneuvering instructions serve the purpose of providing the user with instructions to follow the route starting from the current position. Subsequent to the calculation of the maneuvering instruction, the maneuvering instruction is optically and/or acoustically output. Hence, the maneuvering instruction can for instance be depicted on a display or else can be output to the user in a specific language with the aid of a loudspeaker.

Known navigation systems conventionally are available in the form of a machine-readable software source code and are implemented on suitable devices, such as microcomputers with a central processing unit (CPU).

In this connection, all pre-settings and configurations which are specifically necessary also for calculating and outputting the maneuvering instructions are integrated into the machine-readable source code. This integration of the preset data for the calculation and output of the maneuvering instructions into the machine-readable source code gives rise to considerable drawbacks. Thus, the source code is in each instance dependent upon the respectively utilized software platform, so that if the utilized software platform is modified, it is in each such instance necessary to reprogram the entire source code as well. For example, the source code is fundamentally different if the same has been devised for instance for Windows, Java or the Symbian platform. If flaws in the software module for calculating and outputting the maneuvering instruction are detected and if upgrades are implemented, due to the integration into the software source code it is consequently necessary to revise and update different source codes for the different versions for the various software platforms.

Moreover, flaw analysis and flaw search are significantly complicated as a result of the integration into the machine-readable software source code, since this source code cannot be directly read by the software developers.

Another drawback of utilizing maneuvering instruction routines integrated into the software source code resides in the aspect that the same are likely to feature considerable complexity when being completely programmed. The source code for defining the calculation and output of the maneuvering instructions may encompass several tens of thousands of lines which need to be completely replaced in an update. If the update is carried out via data transfer, for instance via the Internet, correspondingly large data volumes of for instance several hundred kilobytes or some megabytes need to be transferred. It is another drawback in integrating the ancillary conditions for the calculation and output of the maneuvering instructions that user-defined modifications are hardly practicable.

Based on this state of the art, it is hence an object of the present invention to suggest a novel method for operating a navigation system, which eliminates all of the aforesaid drawbacks.

Advantageous embodiments of the invention are the subject-matter of the dependent claims.

It is the gist of the present inventive method that a configuration file is stored in the navigation system and preferably contains all configuring preset data which are required for the calculation and/or the output of the maneuvering instruction. Prior to and/or also during the calculation and the output of a maneuvering instruction, said preset data need to be loaded and interpreted. According to the invention, for this purpose an interpretation module which reads and interprets the stored preset data from the configuration file is provided in the navigation system. Hence, a machine-readable source code, such as for instance can be directly processed by a microprocessor, is not required to be generated. As a consequence, this means that the preset data required for the calculation and/or the output of the maneuvering instruction are no longer integrated in the machine-readable source code of the navigation system, but rather they are stored as data in a separate configuration file. Only prior to or during the calculation and output of the maneuvering instruction are said preset data read and interpreted by the interpretation module.

The inventive method provides a plurality of advantages. The preset data stored in the configuration file can be much more readily analyzed, so that the flaw search and upgrade of the software are simplified. Moreover, storage of the preset data in the inventive configuration file is performed independently of the utilized software platform. This means that if the software is utilized on a different software platform, it is merely necessary to exchange the interpretation module, whereas the preset data may remain unchanged.

Another advantage can be seen in the aspect that the preset data can be compressed to a much higher extent as a result of the separate storage of the configuration file. As a consequence, the required data transfer in the update of the preset data is significantly reduced.

It is particularly advantageous with respect to quick execution of time-critical processes if the interpretation module reads the preset data from the configuration file, stores the same in an access-optimized format in a memory and retrieves and interprets the preset data stored in the memory during calculation and/or output of the maneuvering instruction. Hence, the interpretation of the preset data stored in the memory is always performed in response to requirements, thereby saving processing power.

Optimization in terms of the required storage space by contrast can be attained if the interpretation module reads and/or indirectly interprets the preset data during the calculation and/or output of the maneuvering instruction. An intermediate storage of additional data can then be omitted.

The form in which the configuring preset data for the calculation and/or output of the maneuvering instruction is stored in the configuration file is basically optional. It is particularly advantageous to provide for storage in the form of an alphanumeric text, since this textual form is indirectly readable and interpretable by humans. This is particularly advantageous in the flaw search and upgrade of navigation software.

For simple implementation of the navigation system in the calculation and output of the maneuvering instruction, in fact one configuration file is sufficient. According to a preferred method variation, however, several configuration files are stored in the navigation system, each containing different preset data. As a function of specific ancillary conditions, the navigation system may then select one of the configuration files either automatically or else in a user-defined fashion and may have the same read and interpreted by the interpretation module. As a result, it is thusly possible to readily manipulate the behavior of the navigation system in the calculation and output of the maneuvering instructions by means of modifying the respectively utilized configuration file.

Hence, it is for instance conceivable that respectively different configuration files for executing the maneuvering instructions are stored for different user groups and for different user profiles. If a specific user group or a specific user profile is then determined automatically or else in a user-defined fashion, the behavior of the navigation system in the calculation and output of the maneuvering instruction can be readily adapted to this specific instance by means of reading and interpreting the correspondingly allocated configuration file.

Another option for utilizing configuration files being stored in parallel to one another is that the different configuration files are each allocated to different areas of use. As a result, it can thereby be achieved that the maneuvering instructions in different areas of use, for instance in different states, are each adapted in a different way and are hence adapted to country-specific conditions.

Besides, several configuration files for different times of use can be stored in the navigation system as well. Hence, it is for instance conceivable to adapt the behavior in the calculation and output of the maneuvering instructions to the requirement profile of day and night. As a function of the respective time of use, the navigation system may then automatically load the respectively allocated preset data from the different configuration files and may have the same interpreted in the interpretation module.

Normally, the configuration file will be read at least one time when the navigation system is started, and the preset data stored therein are read and interpreted by the interpretation module. The preset data generated by interpretation are subsequently stored. Besides, according to a preferred embodiment of the inventive method, it is equally conceivable that the configuration file is once again read during operation of the navigation system and is subsequently utilized in the interpretation module as new sequence control. The preset data newly generated by interpretation then replace the previously utilized preset data, for instance by overwriting the corresponding memory areas. As a result, an update of the navigation software which contains modifications in terms of the behavior of the maneuvering instructions can be performed without the need for restarting the entire navigation system. The reloading of different alternatives of configuration files, for instance for different user groups or different user profiles or different areas of use or different times of use, thusly in each instance can be executed as well without the need for restarting the navigation system.

As a function of the complexity of the software for calculating and outputting the maneuvering instruction, the stored preset data may indeed feature a considerable volume. In order to simplify use and management of said data, it is thusly advantageous if the preset data are distributed over several configuration partial files. The distribution of the preset data over several configuration partial files in turn likewise provides advantages with respect to software updates, since modifications correspondingly may merely relate to individual configuration partial files, so that only the respectively concerned configuration partial files need to be exchanged.

The type of preset data stored in the configuration files is basically optional. According to a preferred method variation, provision is thereby made for the aspect that the entire decision logic for determining the timing of the output of a maneuvering instruction sequence is controlled by the preset data. As a result, the entire behavior of the navigation system in the calculation and output of the maneuvering instruction is hence controlled by the preset data from the configuration file.

The decision logic for executing the calculation and output of the maneuvering instruction sequence can thereby be performed with the aid of flow charts stored in tabular form. Said flow charts preferably contain textual information stored in tabular form, displaying a flow chart in a determined fashion. Said flow charts stored in tabular form can in fact be interpreted and graphically displayed for flaw analysis simply with the aid of suitable software modules. For determining a maneuvering instruction basically three steps can be executed. In a first step, a flow chart for calculating a coarse classification of an intersection or a road course is evaluated. The flow chart here contains the rules and decisions which need to be taken and the attributes to be compared. In a second step, a decision table indicative of the language-dependent announcements to be acoustically output and of the conditions under which said announcements are to be output is evaluated. Said decision table as a matter of course is dependent upon the language, so that it is necessary to create a separate decision table for each available language. In a third step, a distance chart indicative of the distance at which the announcement is output as a function of the coarse classification and the vehicle type and as a function of the currently permissible speed or as a function of the current speed is evaluated.

In order to enable said three-step determination of a maneuvering instruction, the configuration file should encompass a decision chart stored in tabular form and/or a distance chart stored in tabular form in addition to a flow chart stored in tabular form.

In the drawings:

FIG. 4 illustrates a distance chart storable in tabular form.

Figure 1:
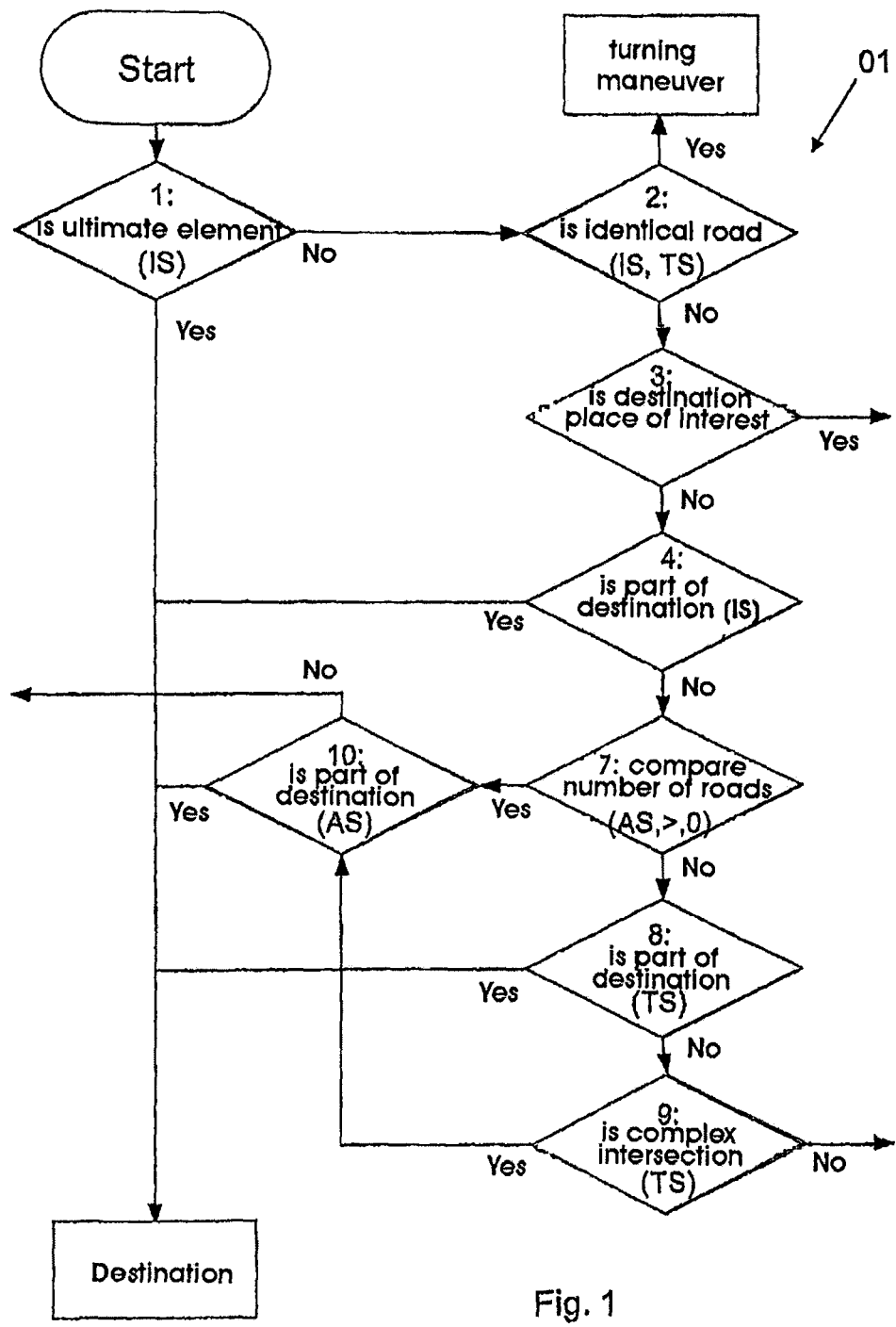
FIG. 1 illustrates a graphically represented flow chart for coarse classification of a road course.

FIG. 1 illustrates a graphically represented flow chart 01, such as required for calculating a maneuvering instruction. In most instances, the coarse classification yields the result "IgnoreJunction". Hence, for the currently analyzed road segment no maneuvering instruction is subsequently generated. It is for instance common practice that a maneuvering instruction is not output in the case of a transition from one road element to a successive road element along the route if there is no option to travel along another route.

In all other instances, a coarse classification is performed, wherein the decision logic is defined by flow chart 01 graphically illustrated in FIG. 1. In order to be able to readily store said decision logic alphanumerically in the form of a configuration file, the flow chart 01 is converted into a flow chart 02 storable in tabular form, as illustrated in FIG. 2.

Figure 2:
FIG. 2 illustrates a flow chart stored in tabular form which corresponds to the flow chart according to FIG. 1.

According to the invention, the tabular flow chart 02 illustrated in FIG. 2 is stored in the navigation system in the form of an alphanumeric text file and is read and interpreted by an interpretation module in the system start-up or subsequent to an update.

The examinations in line with flow chart 02 correspond to analyzing modules in the route guidance unit, which regard the currently examined route segments as well as potentially proximate other segments, and which yield a defined result corresponding to a certain truth value. As a function of the respective truth value, the flow chart can be continued. Hence, for each examination in the flow chart a post-condition as to which examination shall be executed if the examination is successful (yes) or else unsuccessful (no) is defined. In addition, it is also possible that only one post-condition is indicated. If said post-condition for instance yields "Destination", the route guidance operation has been terminated and no further route guidance instructions are output.

For instance, a coarse classification "Destination" (i.e. the destination has been reached) can be attained by passing across nodes K1, K2, K3, K4, K7, K8, K9 and K10 in the flow chart. In accordance with the graphical upgrading of the flow chart 01 (FIG. 1), the decision logic is stored in flow chart 02 in tabular form.

Figure 3:
FIG. 3 illustrates a decision chart storable in tabular form for selecting maneuvering instruction sequences.

On the basis of the coarse classification it is subsequently defined which maneuvering instruction is to be acoustically output. In this context, the allocation between coarse classification and announcement is performed in a separate decision chart 03, as illustrated in FIG. 3.

As a function of the configuration of the navigation system different decision charts 03 can be provided for different language versions. It is equally conceivable that the decisions on the type of the announcement are stored separately from the text to be output in the respective language. The announcement which is identified with the aid of decision chart 03 may additionally contain sentence parts (tags) to be replaced. The tags for instance include the name of the current road, the road name which is reached subsequent to the announcement, the route number, such as "on the A1", signpost information, for instance "towards city center", distance indications, such as distance to announcement, and directional indications, such as the direction which needs to be taken when the announcement is output. The decision chart 03 illustrated in FIG. 3 only exemplarily reflects the potential content of a decision chart. It is also possible that a valid line is not found for a coarse classification, since none of the conditions is met. In this instance, preferably no announcement is generated, cf. in this context the example for coarse classification "PriorityManeuver". If the driver stays on the priority road and travels straight on, none of the two lines is activated. Hence, in this instance no announcement is generated.

However, if an announcement is generated, the tags placed in angle brackets still need to be completed. In the example, the coarse classification "PriorityManeuver" indicates the distance in which the priority road is left. If the vehicle is remote from the point of action by more than a pre-configurable distance of e.g. 700 meters, the announcement given under "remote" is utilized and is output upon arrival at the 700 meters mark. The tag "Distance" is furnished with the determined distance and the tag "Direction" is furnished with e.g. "turn right". This would result in the announcement "turn right in 700 meters and leave the priority road".

A distance chart 04 is exemplarily illustrated in FIG. 4. In the distance chart 04, the distance in which an announcement needs to be output is defined for all coarse classifications. In this connection, each coarse classification contains different distances. For instance the distances "very remote", "remote", "proximate" and "very proximate" may be available. If the coarse classification reveals that the user is located on an expressway, in this context the distances are selectable in a correspondingly larger manner in contrast to a coarse classification of an urban road.

The decision chart 04 is analyzed and the maneuvering output is executed if the positioning unit of the navigation device indicates that the distance configured in the distance chart starting from the current position to the identified maneuver is available.

In this context, it is basically optional if the analysis of the route is completely performed subsequent to the route calculation, and hence all results of the route guidance unit are stored in the memory and can be retrieved as a function of the position determined by the positioning unit, or if the analysis is performed in the route guidance unit during the travel along the route, and the instructions are correspondingly output ad hoc or else in a buffered fashion.

The inventive method enables the upgrade of known navigation systems with the following options:

1. Selectable route guidance strategy: When configuring the navigation system, the user may be provided with a selection as to the motives according to which maneuvering instructions are to be created. Hence, the number of announcements per maneuver can be reduced. The implementation of said option is very easy by using the inventive method, since for each of the preset options a separate configuration file is available which needs to be correspondingly utilized by the route guidance unit. In this context, a strategy change during an ongoing route guidance operation is also conceivable, wherein the part of the route that has not yet been traveled along is analyzed by the newly configured route guidance unit.
2. Updatability: Besides, the inventive method allows readily updating and patching the present route guidance strategy. For this purpose, merely the configuration files need to be exchanged, which is conceivable for instance by means of a download via the navigation device. In this context, it is a prerequisite to establish a connection with a server, for instance via the Internet or else wirelessly via WLAN or UMTS.
3. Language support: The inventive method facilitates using different languages. The addition of further languages is also readily feasible using the inventive method and does not require the exchange of the entire navigation software. Merely a list of the instantaneously available languages needs to be known to the navigation software, so that a new language can be correspondingly provided.

The invention claimed is:

1. Method for operating a navigation system comprising the following method steps of:
    a) calculating a route from a point of departure to a destination, said route being composed of a succession of route segments and junctions between the route segments and being selected by means of a route calculation process from a database in which a geographical region is described by route segments and junctions;
    b) calculating a maneuvering instruction sequence which contains instructions for the user to follow the route starting from the current position, the maneuvering instruction sequence is retrieved and output from a database;
    c) optically and/or acoustically outputting the maneuvering instruction sequence in an output device; characterized in that
    prior to the calculation and output of the maneuvering instruction sequence, at least two human-readable configuration files are read and interpreted by an interpretation module associated with a software platform utilized for the navigation system;

wherein preset data for calculating and/or for outputting the maneuvering instruction sequence are stored in the configuration files and define a decision logic for determining the maneuvering instruction sequence and a temporal flow chart of the maneuvering instruction sequence;

wherein during calculation of the maneuvering instruction sequence includes performing a coarse classification of an intersection or a road section on the route;

wherein the interpretation module includes machine-readable source code processed by a microprocessor and software platform to enable utilization of the configuration files on different software platforms;

wherein storage of the preset data in the configuration files is performed independently of the software platform and the configuration files are read by the interpretation module as a function of a user croup or user profile to adapt the calculation and output of the maneuvering instruction sequence to the corresponding configuration file, the configuration files manipulating the behavior of the navigation system by modification or selection thereof without the need for restarting the navigation system.

2. Method according to claim 1,
characterized in that
the interpretation module reads the preset data from the configuration file, the preset data are subsequently stored in a memory in an access-optimized format, wherein the interpretation module accesses and interprets the preset data stored in the memory during calculation and/or output of the maneuvering instruction sequence.

3. Method according to claim 1,
characterized in that
the interpretation module reads and directly interprets the preset data during calculation and/or output of the maneuvering instruction sequence.

4. Method according to claim 1,
characterized in that
the configuring preset data for the calculation and/or output of the maneuvering instruction sequence are stored in the configuration file in the form of an alphanumeric text.

5. Method according to claim 1,
characterized in that
the configuration files are selected automatically or in a user-defined fashion.

6. Method according to claim 5,
characterized in that
different configuration files are read by the interpretation module as a function of the area of use.

7. Method according to claim 5,
characterized in that
different configuration files are read by the interpretation module as a function of the time of use.

8. Method according to claim 1,
characterized in that
the configuration file is read during the run-time of the navigational process, wherein the preset data generated therefrom by the interpretation module by interpretation replace the previously used preset data.

9. Method according to claim 1,
characterized in that
the preset data are distributed over several configuration partial files, wherein all configuration partial files are successively read and interpreted.

10. Method according to claim 1,
characterized in that
the configuration file contains at least one flow chart stored in tabular form.

11. Method according to claim 10,
characterized in that
during generation of the maneuvering instruction sequence, coarse classification of an intersection or a road section on the route is performed by evaluating the tabular flow chart.

12. Method according to claim 10,
characterized in that
the flow chart stored in tabular form comprises several lines and several columns, wherein each line is representative of one decision node of the flow chart.

13. Method according to claim 12,
characterized in that
each line contains a condition cell which features a logic condition.

14. Method according to claim 12,
characterized in that
each line features at least one reference cell, wherein the reference cell contains the cross-references to other decision nodes, and wherein during processing of the tabular flow chart, commencing at a start line, the respective logic condition of the condition cell is responded to and the cross-reference from the same line allocated to the response is executed.

15. Method according to claim 10,
characterized in that
the configuration file contains at least one decision chart stored in tabular form, wherein during generation of the maneuvering instruction sequence, the selection of the maneuvering instruction sequence, which is retrieved and output from a database, is performed by evaluation of the decision chart.

16. Method according to claim 10,
characterized in that
the configuration file contains at least one distance chart stored in tabular form, wherein during generation of the maneuvering instruction sequence, the timing of the output of the maneuvering instruction sequence is controlled by evaluation of the distance chart.

\* \* \* \* \*